US009073536B2

(12) United States Patent
Endo et al.

(10) Patent No.: US 9,073,536 B2
(45) Date of Patent: Jul. 7, 2015

(54) HYBRID VEHICLE

(75) Inventors: Hiroki Endo, Nisshin (JP); Masaya Yamamoto, Kasugai (JP); Kensuke Kamichi, Nagakute (JP); Yusuke Yamanaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/365,719

(22) PCT Filed: Dec. 15, 2011

(86) PCT No.: PCT/JP2011/079096
§ 371 (c)(1),
(2), (4) Date: Jun. 16, 2014

(87) PCT Pub. No.: WO2013/088563
PCT Pub. Date: Jun. 20, 2013

(65) Prior Publication Data
US 2014/0358347 A1    Dec. 4, 2014

(51) Int. Cl.
*B60W 10/08* (2006.01)
*B60K 6/445* (2007.10)
*B60W 10/06* (2006.01)
*B60W 20/00* (2006.01)

(52) U.S. Cl.
CPC ............... *B60W 10/08* (2013.01); *B60K 6/445* (2013.01); *B60W 10/06* (2013.01); *B60W 2540/103* (2013.01); *B60W 20/40* (2013.01); *Y02T 10/6286* (2013.01); *Y02T 10/6239* (2013.01); *B60W 20/00* (2013.01); *Y10S 903/93* (2013.01)

(58) Field of Classification Search
CPC ..... B60W 10/00; B60W 10/04; B60W 10/06; B60W 10/08; B60W 20/00; B60W 20/10; B60W 20/106; B60W 20/1062; B60W 20/40; B60K 6/445
See application file for complete search history.

(56) References Cited

U.S. PATENT DOCUMENTS

| | | | |
|---|---|---|---|
| 2001/0039230 A1* | 11/2001 | Severinsky et al. | 477/3 |
| 2003/0221883 A1 | 12/2003 | Kubodera | |
| 2008/0154455 A1* | 6/2008 | Hidaka et al. | 701/22 |
| 2010/0004807 A1* | 1/2010 | Kydd | 701/22 |
| 2011/0022255 A1* | 1/2011 | Yamada et al. | 701/22 |
| 2011/0112708 A1* | 5/2011 | Fassnacht | 701/22 |

FOREIGN PATENT DOCUMENTS

| | | |
|---|---|---|
| JP | A 2003-343303 | 12/2003 |
| JP | A 2006-025487 | 1/2006 |
| JP | A-2008-230409 | 10/2008 |
| JP | A-2011-57115 | 3/2011 |

* cited by examiner

*Primary Examiner* — Jerrah Edwards
*Assistant Examiner* — Tamara Weber
(74) *Attorney, Agent, or Firm* — Oliff PLC

(57) ABSTRACT

A hybrid vehicle for reducing a variation in accelerator position when an EV mode is switched to a HV mode is provided. A controller executes the following process during running in the EV mode. The controller sets an increase of the accelerator position from a first accelerator position to a switching accelerator position at which a switch to the HV mode is to be made as a first increase when an output of a motor has reached an output upper limit at the first accelerator position. The controller sets an increase of the accelerator position from a second accelerator position to the switching accelerator position as a second increase which is smaller than the first increase when the output of the motor has reached the output upper limit at the second accelerator position which is larger than the first accelerator position.

6 Claims, 8 Drawing Sheets

HYBRID VEHICLE

TECHNICAL FIELD

The present invention relates to a hybrid vehicle provided with an EV mode in which the hybrid vehicle runs only with a motor without using an engine and an HV mode in which the hybrid vehicle runs using a combination of the engine and the motor.

BACKGROUND ART

The spread of a hybrid vehicle is accelerated. With an improvement in battery performance or motor control technology, the ratio of use of an EV mode in which the hybrid vehicle runs only with a motor without using an engine (the ratio of use time of the EV mode to that of an HV mode) is increased. However, it is not possible to obtain a large output only with the motor, and a situation in which the HV mode in which the motor and the engine are used in combination is used still exists.

Many users desire to drive the hybrid vehicle in the EV mode as much as possible. To cope with this, a technology for increasing the ratio of use of the EV running mode is proposed in, e.g., Patent Document 1 or Patent Document 2.

The increase in the ratio of use of the EV running mode corresponds to a decrease in the ratio of use of the engine. If the engine is not used, a driving force (driving torque) may be insufficient when an accelerator pedal is depressed. Patent Document 1 discloses a technology for preventing acceleration performance from being impaired in the EV mode. According to the technology of Patent Document 1, when a driving torque reaches an EV running available maximum torque in accordance with an increase in accelerator position, a controller of the hybrid vehicle keeps the EV running available maximum torque until the accelerator position further increases a predetermined amount dACC, and switches from the EV mode to the HV mode when the accelerator position increases beyond dACC. According to the technology of Patent Document 1, it is possible to keep the EV mode without suppressing the accelerator position to a low level, and acceleration in the EV mode is scarcely impaired.

Patent Document 2 discloses a technology for displaying the accelerator position at which the EV mode is switched to the HV mode. A user can adjust the accelerator position so as to keep the EV mode based on the display.

CITATION LIST

Patent Literatures

Patent Document 1: Japanese Patent Application Publication No. 2008-230409;
Patent Document 2: Japanese Patent Application Publication No. 2011-57115.

SUMMARY OF INVENTION

The controller of the hybrid vehicle is programmed such that the running mode is switched to the HV mode in the case where an output becomes insufficient only with the motor. Herein, the controller of the hybrid vehicle determines the output in accordance with mainly a vehicle speed and the accelerator position. Consequently, when the accelerator position is increased, the controller switches from the EV mode to the HV mode. Users, who empirically know the behavior of the controller, adjust the accelerator position such that the switch to the HV mode is not made as much as possible.

On the other hand, the controller sets an upper limit to the output of the motor (output upper limit). The output upper limit is determined on a program of the controller. The output upper limit is not determined by a nominal maximum output of the motor, but determined in accordance with conditions such as the temperature of the motor and a remaining amount (state of charge (SOC)) of a battery. For example, in the case where the temperature of the motor is high, the controller may reduce the output upper limit of the motor in order to avoid overheat. The controller determines the output of the motor based on the vehicle speed and the accelerator position, and the value of the output of the motor is limited to the output upper limit. That is, when the output of the motor has reached the output upper limit, the controller limits the output of the motor to the output upper limit even when the accelerator position is further increased. Subsequently, when the accelerator position is increased from an accelerator position Pr at which the output upper limit has been reached by a predetermined increase dP, the controller starts the engine and switches from the EV mode to the HV mode. At this point, the motor output is constantly kept at the output upper limit while the accelerator position is in a range between Pr and Pr+dP.

The accelerator position Pr at which the motor output reaches the output upper limit is dependent on the vehicle speed. Therefore, in the case where the increase dP described above is constant, Pr+dP, i.e., the accelerator position at which the EV mode is switched to the HV mode varies. It is inconvenient for users who adjust the accelerator position so as to be kept the EV mode that the accelerator position at which the EV mode is switched to the HV mode is not constant.

The present specification provides a technology for reducing a variation in accelerator position at which the EV mode is switched to the HV mode.

A novel hybrid vehicle disclosed in the present specification includes a controller configured to set an output upper limit to output power of a motor and configured to adjust an output of the motor to the output upper limit or less in accordance with a vehicle speed and an accelerator position. Further, during running in an EV mode, as the accelerator position at which the output upper limit has been reached is higher, the controller of the hybrid vehicle is configured to set a smaller value to an increase from the accelerator position to an accelerator position at which an engine is to be started (a switching accelerator position). Note that "starting the engine" is equivalent to switching from the EV mode to an HV mode. For example, during running in the EV mode, the controller sets an increase of the accelerator position from a first accelerator position Pr1 to a switching accelerator position Psw at which a switch to the HV mode is to be made as a first increase dP1 when the output of the motor has reached an output upper limit (Fmax) at the first accelerator position Pr1. The controller sets an increase of the accelerator position from a second accelerator position Pr2 to the switching accelerator position Psw as a second increase dP2 which is smaller than the first increase dP1 when the output of the motor has reached the output upper limit (Fmax) at the second accelerator position Pr2 which is larger than the first accelerator position Pr1. Further, the controller decreases a ratio of a motor output increase relative to an accelerator operation increase in an accelerator position range from the accelerator position (the first accelerator position Pr1 or the second accelerator position Pr2) at which the output of the motor has reached the output upper limit (Fmax) to the switching accelerator position than in an accelerator position range before the output of the motor has reached the output upper limit. The switching accelerator position Psw is represented by Pr1+dP1 or Pr2+dP2. Herein, Pr1<Pr2 is established and dP1>dP2 is also established, and hence |Pr1−Pr2|>|(Pr1+dP1)−(Pr2+dP2)| is satisfied. In other words, even if the accelerator position when the motor upper limit (Fmax) has been reached is varied (Pr1 and Pr2), the difference when the EV mode is switched to the HV mode |(Pr1+dP1)−(Pr2+dP2)| is smaller than the difference between Pr1 and Pr2. That is, the variation in accelerator position at which the EV mode is switched to the HV mode is reduced.

In a preferred aspect of the hybrid vehicle disclosed in the present specification, the controller is configured to switch from the EV mode to the HV mode when the accelerator position reaches a particular switching accelerator position irrelevant to the accelerator position at which the output of the motor has reached the output upper limit Fmax. Since the EV mode is switched to the HV mode at the particular accelerator position, it becomes easy for a user to adjust the accelerator position such that the EV mode is kept.

The controller preferably has a torque-dependent engine start process in which the controller starts the engine when a required torque exceeds a predetermined torque upper limit. In this case, the controller stops the torque-dependent engine start process based on a signal from a switch operated by a driver or a signal from a navigator.

Further, the controller preferably executes the following process. After having switched to the HV mode, the controller sets the switching accelerator position for switching from the HV mode to the EV mode to be less than the switching accelerator position for switching from the EV mode to the HV mode. At the same time, the controller sets the output upper limit after having switched from the HV mode to the EV mode to be greater than the output upper limit in the EV mode before having switched to the HV mode. After having switched to the HV mode, it is preferable that the HV mode is kept, instead of easily switching back to the EV mode with a slight reduction in accelerator position. When the above algorithm is provided, it is possible to avoid frequent mode switches.

The controller may be configured to keep the output of the motor at a level by which the accelerator position has reached the first accelerator position while the accelerator position is in a range between the first accelerator position and the switching accelerator position or in a range between the second accelerator position and the switching accelerator position. Alternatively, the controller may be configured to gradually increase the output upper limit of the motor in accordance with an increase in the accelerator position, and gradually increase the output of the motor within a range of and below the output upper limit while the accelerator position is in a range between the first accelerator position and the switching accelerator position or in a range between the second accelerator position and the switching accelerator position.

The details of the technology disclosed in the present specification and a further improvement therein are described in DESCRIPTION OF EMBODIMENTS.

DESCRIPTION OF EMBODIMENTS

Figure 1:
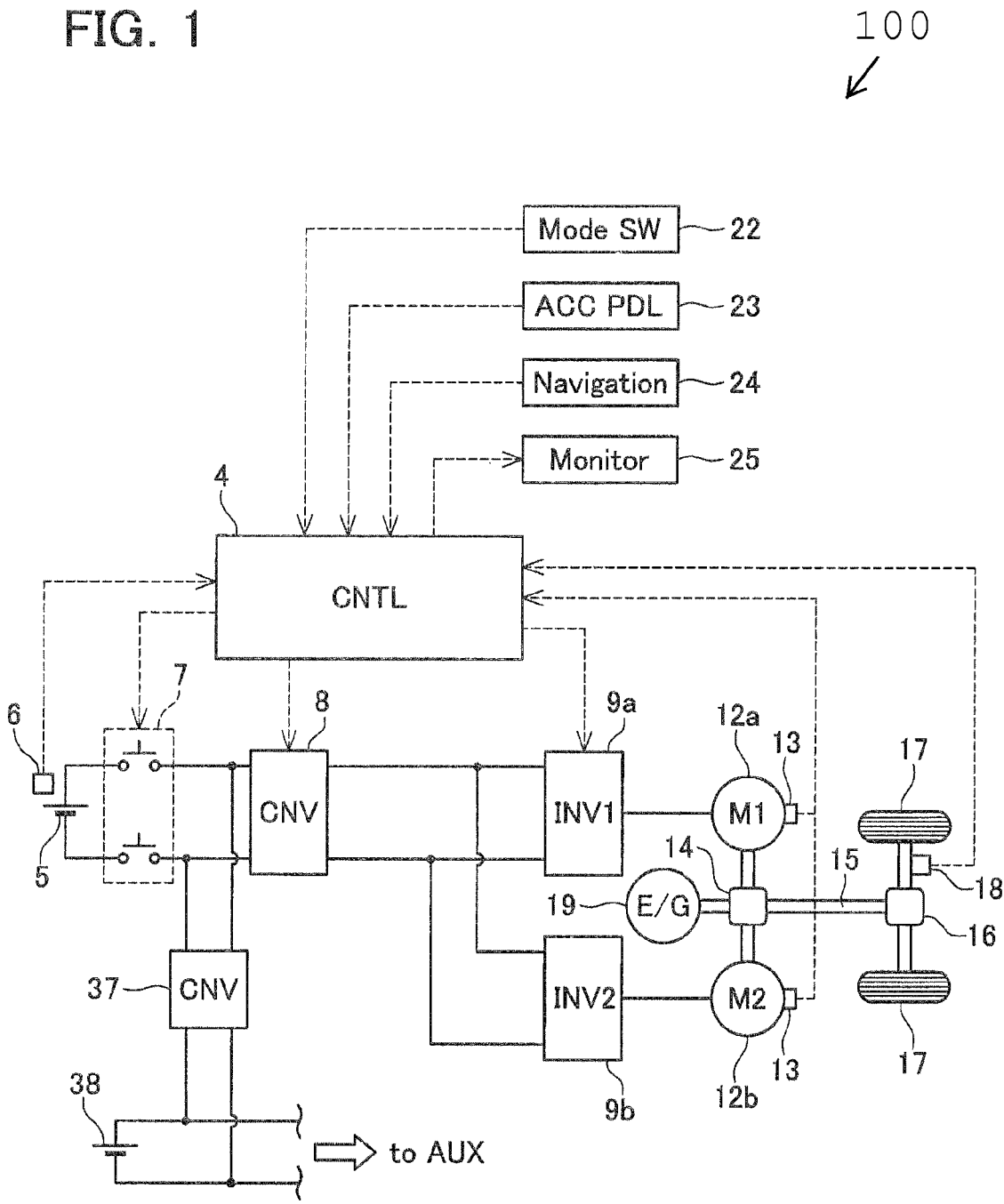
FIG. 1 shows a system block diagram of a hybrid vehicle.

A hybrid vehicle 100 of an embodiment will be described with reference to the drawings. The hybrid vehicle 100 runs while automatically switching between an EV mode in which the hybrid vehicle 100 runs only with a motor 12 and an HV mode in which the hybrid vehicle 100 runs using a combination of the motor 12 and an engine 19. Note that, although the detail is described later, the EV mode includes two modes (a first EV mode and a second EV mode).

First, a drive mechanism system of the hybrid vehicle 100 is described. The hybrid vehicle 100 includes two motors (a first motor 12a and a second motor 12b) and the engine 19 as drive sources. Output torques of the two motors 12a and 12b and the engine 19 are appropriately split or combined in a power distribution mechanism 14, and transmitted to an axle 15. The axle 15 operates in synchronization with drive wheels 17 via a differential 16. In the case where a large driving force (torque) is required, the second motor 12b is driven together with the engine 19 (the HV mode). The first motor 12a is used mainly as a starter and a generator. However, in the case where the larger driving force is required, the first motor 12a is also driven together with the second motor 12b with electric power of a battery. The respective driving forces (torques) are combined in the power distribution mechanism 14 and transmitted to the drive wheels 17 via the axle 15. In the case where the large driving force is not required, e.g., in the case where the hybrid vehicle 100 runs at a constant speed, the engine 19 is stopped and the hybrid vehicle 100 runs only with the second motor 12b (the EV mode). On the other hand, when a remaining amount of a main battery 5 is reduced to a low level, the engine 19 is started, and the torque of the engine 19 is distributed to the axle 15 and the first motor 12a by the power distribution mechanism 14. The first motor 12a is driven to generate electric power while driving the drive wheels 17 with the driving force of the engine 19. In the case where a driver depresses a brake pedal, the axle 15 is directly connected to the motors 12a and 12b, the motors 12a and 12b are reversely driven from their output shaft sides with kinetic energy of the vehicle, and electric power is thereby generated. That is, the hybrid vehicle 100 converts the kinetic energy of the vehicle to electric energy, and charges the main battery 5 with the electric power.

As described above, the first motor 12a also functions as the starter that starts the engine 19 when the EV mode is shifted to the HV mode. Note that the power distribution mechanism 14 is a planetary gear, a sun gear of the planetary gear is coupled to the first motor 12a, a planetary carrier is coupled to the engine 19, and a ring gear of the planetary gear is engaged with the axle 15. The second motor 12b is engaged with the axle 15 via another gear. The motors 12a and 12b and the engine 19 are controlled by a controller 4.

Note that the hybrid vehicle 100 actually includes a large number of controllers provided for individual functions, and the large number of controllers cooperate to thereby function as one vehicle system. However, in the present specification, in order to simplify the description, even if the controller is physically divided into a plurality of controllers, the controllers are collectively referred to as the "controller 4".

Electric power for driving the first and second motors 12a and 12b is supplied from the main battery 5. The output voltage of the main battery 5 is, e.g., 300 [V]. The main battery 5 is connected to a first converter 8 via a system main relay 7. The system main relay 7 is a switch that connects or disconnects the main battery 5 to or from the drive system of the vehicle. The system main relay 7 is switched by the controller 4.

The first converter 8 increases the voltage of the main battery 5 to a voltage suitable for driving the motor (e.g., 600 [V]). The output of the first converter 8 is sent to a first inverter 9a and a second inverter 9b. The first inverter 9a converts DC electric power outputted by the first converter 8 to AC electric power having a predetermined frequency, and supplies the AC electric power to the first motor 12a. The second inverter 9b converts the DC electric power outputted by the first converter 8 to AC electric power having a predetermined frequency, and supplies the AC electric power to the second motor 12b. Note that, in the case where the first motor 12a and the second motor 12b generate electric power by using deceleration energy of the vehicle, AC electric power generated by the motors (regenerative electric power) is converted to DC electric power by the inverters 9a and 9b, and the voltage thereof is reduced to a voltage corresponding to the output voltage of the main battery 5 by the first converter 8. Thus, the hybrid vehicle 100 is capable of charging the main battery 5 with the regenerative electric power.

The output of the main battery 5 is also sent to a second converter 37. The second converter 37 is a step-down DCDC converter that reduces the output voltage of the first converter 8 (e.g., 600 [V]) to a voltage suitable for driving other electronic devices (e.g., 12 [V]). The second converter 37 supplies electric power to a device (low-power device) driven with a low voltage of 12 [V]. Examples of the low-power device include a room light, a car audio, and a car navigator 24. In addition, the "low-power device" includes circuits of various controllers mounted on the vehicle. The controller 4 that generates PWM signals as commands to the first converter 8, the second converter 37, the first inverter 9a, and the second inverter 9b is also one of the devices driven at 12 [V]. Hereinbelow, the devices driven at 12 [V] are collectively referred to as "auxiliary equipment". "AUX" in FIG. 1 denotes the group of the auxiliary equipment.

The output of the second converter 37 is also supplied to a sub-battery 38 of 12 [V]. That is, by using the electric power of the main battery 5 having a high output and a high capacity for driving the motor, charge of the sub-battery 38 and electric power supply to the auxiliary equipment are carried out. The sub-battery 38 having the output of 12 [V] is provided for the purpose of supplying electric power to the auxiliary equipment when the auxiliary equipment cannot receive the electric power supply from the main battery 5. That is, the sub-battery 38 supplies the electric power to the auxiliary equipment when the system main relay 7 is released.

The controller 4 controls the motors 12a and 12b and the engine 19 based on data of various sensors of the vehicle and signals from other devices. Examples of the sensor used by the controller 4 include a battery sensor 6 that measures the remaining amount (state of charge (SOC)) of the main battery 5, a revolution sensor 13 that measures the revolution of each of the motors 12a and 12b, a vehicle speed sensor 18, and a pedal sensor 23 that measures an accelerator position. In addition, the controller 4 controls the motors 12a and 12b and the engine 19 also based on signals from the car navigator 24 and a mode selection switch 22 provided at a driver's seat. The control state is displayed on a monitor 25 provided at the driver's seat.

The controller 4 switches between the EV mode in which the engine 19 is stopped and the hybrid vehicle 100 runs only with the second motor 12b and the HV mode in which the engine 19 is started and the hybrid vehicle 100 runs using the combination of the engine 19 and the second motor 12b. Note that the first motor 12a is used together with the second motor 12b on an as needed basis. Before the description of its switch process, the relationship among the accelerator position, a required torque, a battery output, and a motor output will be described.

Figure 2:
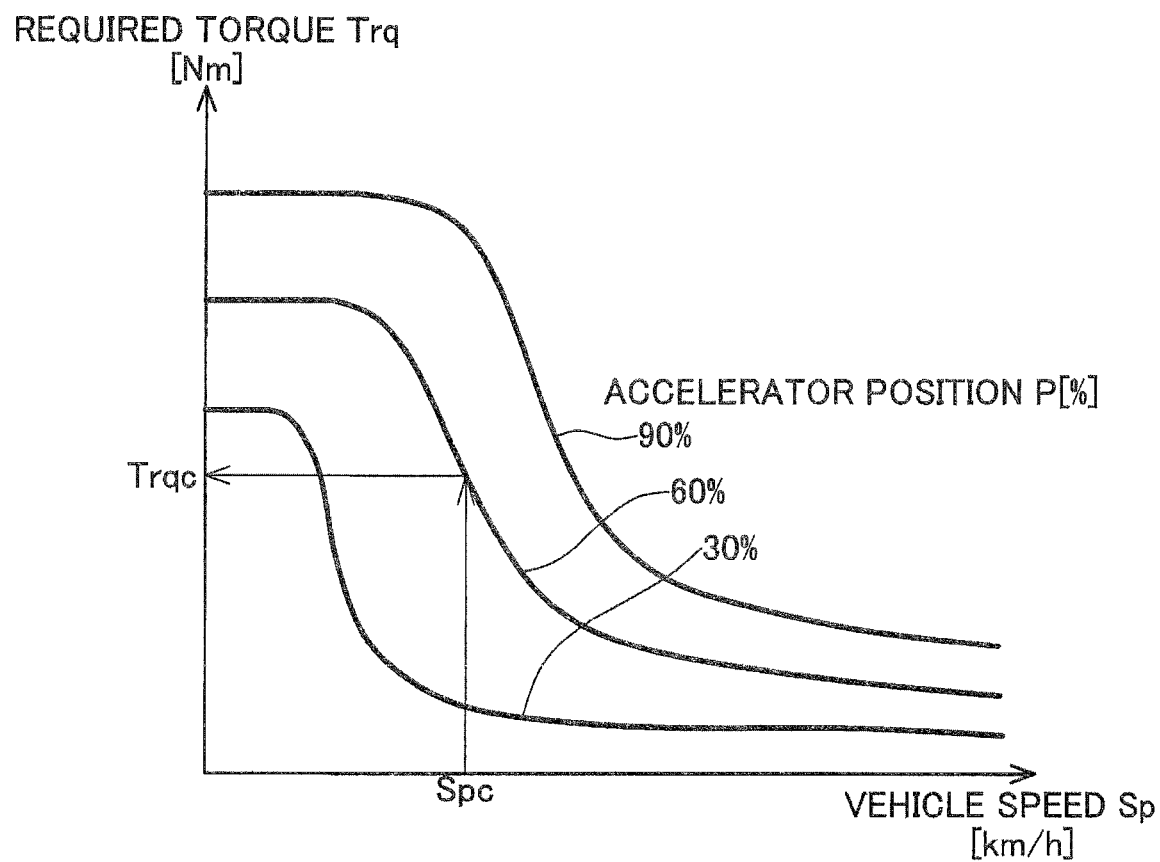
FIG. 2 shows an example of a graph that determines a required torque (a relationship between a vehicle speed and the required torque)

FIG. 2 is a graph showing the relationship between a vehicle speed Sp and a required torque Trq at various accelerator positions P. The "required torque" means a "torque required by a driver", and is predetermined based on the vehicle speed and the accelerator position. The relationship of the graph of FIG. 2 is pre-stored in the controller 4. The controller 4 determines the required torque Trq from the present vehicle speed Sp and the present accelerator position P. For example, when the present accelerator position P is 60% and the present vehicle speed is Spc, the required torque is Trqc from the graph of FIG. 2. Next, the controller 4 converts the required torque Trq [Nm] to a target output Ftgt [W]. The torque [Nm] and the output [W] satisfy the relationship of [output (W)]=0.1047×[revolution (rpm)]×[torque (Nm)]. The controller 4 determines the target output Ftgt to be outputted by the drive system by using this expression. As is clear from FIG. 2, even when the accelerator position is unchanged, the required torque, i.e., the target output Ftgt is changed depending on the vehicle speed. Note that the "target output" corresponds to a command value to the motor, and hence the "target output" in the EV mode corresponds to the "motor output".

Figure 3:
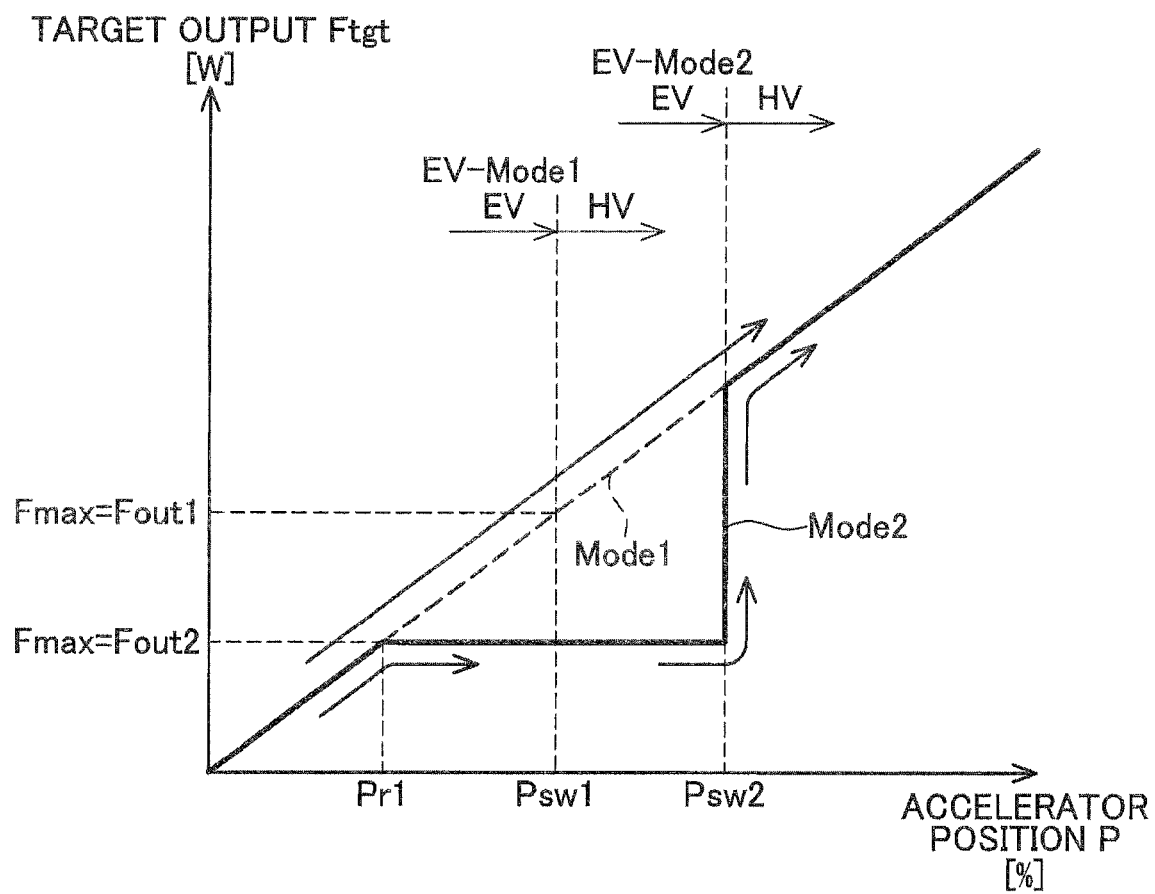
FIG. 3 is a graph for explaining a difference between two EV modes (a relationship between an accelerator position and an output)

The switch process between the EV mode and the HV mode is described. Roughly speaking, the controller 4 selects the EV mode when the accelerator position is small, and selects the HV mode when the accelerator position is large. FIG. 3 shows an example of the relationship between the accelerator position and the target output Ftgt. The controller 4 has two EV modes. EV mode 1 (a first EV mode) is a mode in which the EV mode is switched to the HV mode in the case where the accelerator position exceeds Psw1. EV mode 2 (a second EV mode) is a mode in which the EV mode is switched to the HV mode in the case where the accelerator position exceeds Psw2. The switching accelerator position Psw2 in EV mode 2 is larger than the switching accelerator position Psw1 in EV mode 1. However, a motor output upper limit Fout2 in EV mode 2 is smaller than a motor output upper limit Fout1 in EV mode 1. Here, the motor output upper limit Fout is the upper limit of the command value to the motor, and corresponds to the upper limit of the target output Ftgt described above. That is, in a range where the accelerator position is smaller than the switching accelerator position Psw, in the case where the calculated target output Ftgt exceeds the motor output upper limit Fout, the controller 4 limits the target output as the command value to the motor to the motor output upper limit Fout.

In an example of FIG. 3, in the case of EV mode 2, the target output Ftgt reaches the motor output upper limit Fout2 at the accelerator position P=Pr1, and the controller 4 limits the target output Ftgt to its upper limit Fout2 at the accelerator position P>Pr1. In the case where the accelerator position P exceeds the switching accelerator position Psw2, the controller 4 starts the engine 19 and shifts a running mode to the HV mode. When the engine is started, the output of the engine is added to the output of the motor, and hence the driving force (output) of the vehicle stepwise increases.

In the case of EV mode 1, the target output Ftgt reaches the motor output upper limit Fout1 (Fout1>Fout2) at the switching accelerator position Psw=Psw1. When the switching accelerator position Psw=Psw1 is exceeded, the controller 4 immediately starts the engine and shifts the running mode to the HV mode. When the target output Ftgt exceeds the motor output upper limit Fout1, the driving force of the engine is immediately added, and hence the actual output continuously increases before and after the switching accelerator position Psw1.

EV mode 1 and EV mode 2 described above can be summarized as follows. In EV mode 1 (the first EV mode), the controller 4 sets the motor output upper limit Fmax in the EV mode to the first output upper limit Fout1, and sets the switching accelerator position Psw at which the EV mode is switched to the HV mode to the first accelerator position Psw1. In EV mode 2 (the second EV mode), the controller 4 sets the motor output upper limit Fmax in the EV mode to the second output upper limit Fout2 which is lower than the first output upper limit Fout1, and sets the switching accelerator position at which the EV mode is switched to the HV mode to the second switching accelerator position Psw2 which is larger than the first switching accelerator position Psw1.

Figure 4:
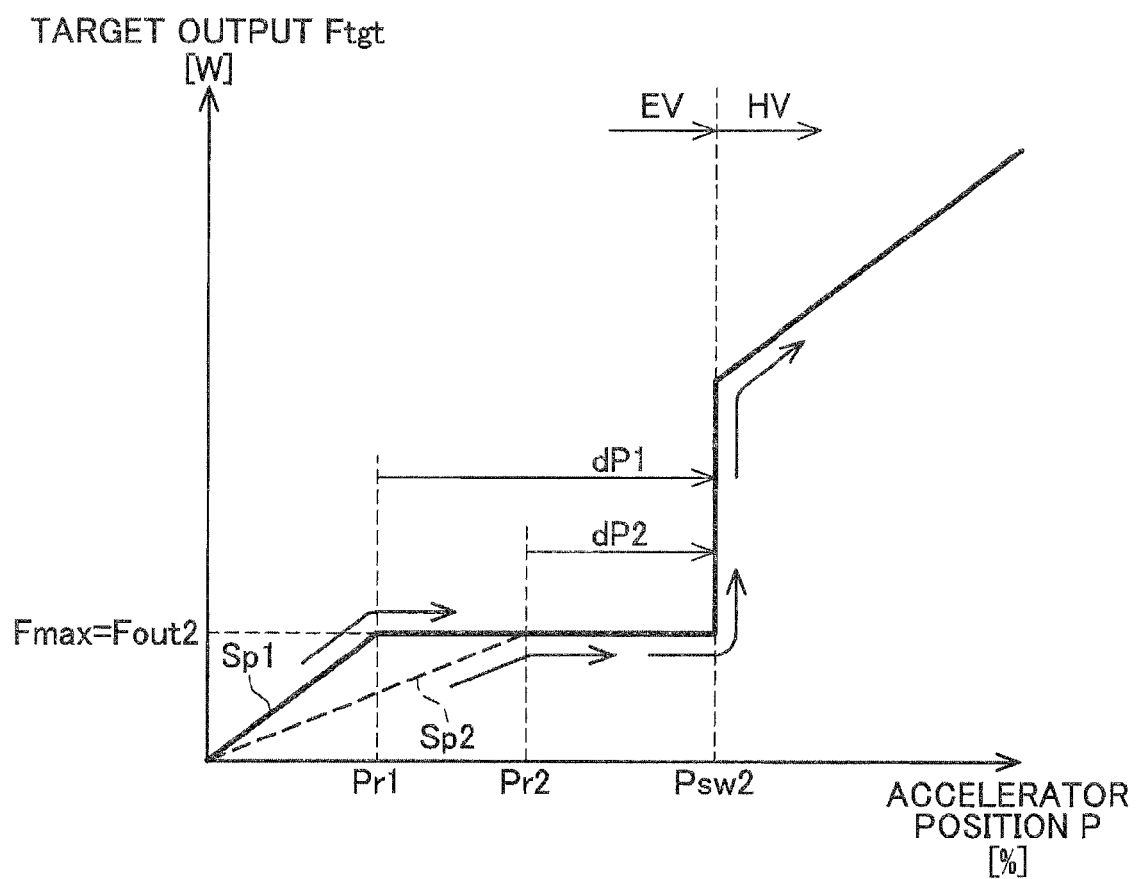
FIG. 4 is a graph showing an example of mode switch in different vehicle speeds.

EV mode 2 (the second EV mode) is described in greater detail. As described above, the target output Ftgt is dependent on not only the accelerator position but also the vehicle speed. That is, even when the accelerator position is unchanged, the target output Ftgt is changed when the vehicle speed is changed. FIG. 4 shows the relationship between the accelerator position and the target output Ftgt in different vehicle speeds. A graph in a solid line indicates the case of the vehicle speed Sp=Sp1. A graph in a broken line indicates the case of the vehicle speed Sp=Sp2. Here, Sp1>Sp2 is satisfied. As is clear from FIG. 4, it should be noted that, even when the accelerator position is unchanged, the target torque Ttgt becomes larger as the vehicle speed is lower, but the target output Ftgt becomes smaller (because output=torque×revolution is established).

In an example of FIG. 4, in the case of the vehicle speed Sp=Sp1, the target output Ftgt reaches the motor output upper limit Fout2 at the first accelerator position Pr1, and the target output is kept at the motor output upper limit Fout2 until the accelerator position P reaches Psw2. The accelerator position P=Psw2 is the switching accelerator position in EV mode 2 and, when the accelerator position P exceeds the switching accelerator position Psw2, the controller 4 switches from EV mode 2 to the HV mode. Herein, in the case where the motor output upper limit Fout2 has been reached when the accelerator position P is the first accelerator position Pr1, the controller 4 sets an increase of the accelerator position from the first accelerator position pr1 to the switching accelerator position Psw2 at which the switch to the HV mode is to be made as a first increase dP1.

On the other hand, in the case of the vehicle speed Sp=Sp2 (<Sp1), the target output Ftgt reaches the motor output upper limit Fout2 at the second accelerator position P=Pr2 (see the broken line in FIG. 4). In this case as well, the target output Ftgt is kept at the motor output upper limit Fout2 until the accelerator position P reaches Psw2 (i.e., the switching accelerator position). When the accelerator position exceeds Psw2, similarly to the case of the vehicle speed Sp=Sp1, the controller 4 switches from EV mode 2 to the HV mode. Herein, in the case where the motor output upper limit Fout2 has been reached when the accelerator position P is the second accelerator position Pr2, the controller 4 sets an increase of the accelerator position from the second accelerator position Pr2 to the switching accelerator position Psw2 at which the switch to the HV mode is to be made as a second increase dP2. As is clear from FIG. 4, the second increase dP2 is smaller than the first increase dP1.

As described above, in EV mode 2, as the accelerator position when the motor output upper limit Fout2 has been reached is higher (Pr2>Pr1), the hybrid vehicle 100 sets the value of the increase from the accelerator position at that point to the switching accelerator position Psw2 to a smaller value (dP2<dP1). Even in the case where the accelerator positions when the motor output upper limit Fout2 has been reached are different, the switching accelerator position Psw2 at which the switch to the HV mode is to be made is unchanged. Consequently, it becomes easy for a user to adjust the accelerator position such that the accelerator position is equal or less than the switching accelerator position Psw2 in order to keep the EV mode.

Figure 5:
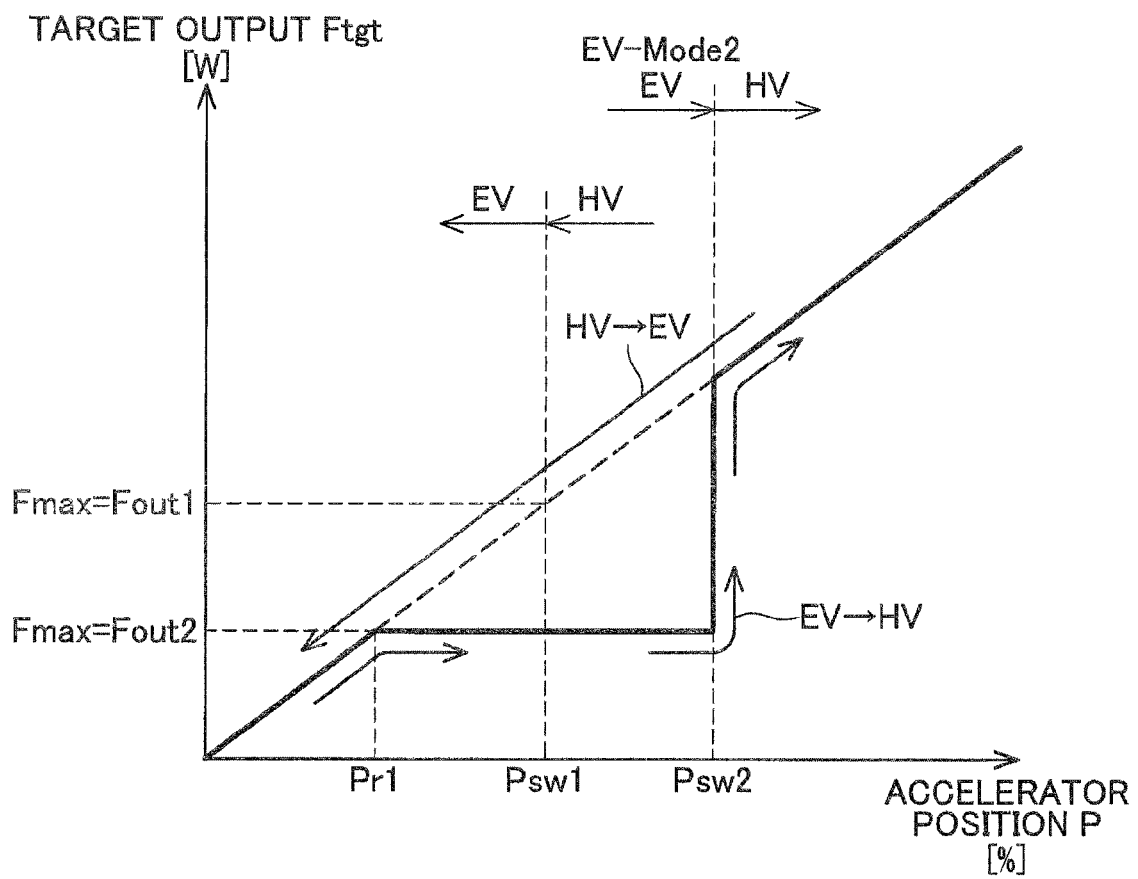
FIG. 5 is a view for explaining a difference between a shift from the EV mode to an HV mode and a shift from the HV mode to the EV mode.

Next, the switch process from the HV mode to the EV mode is described. FIG. 5 shows the relationship between the accelerator position P and the target output Ftgt in the case where the EV mode is switched to the HV mode and in the case where the HV mode is switched to the EV mode. The solid line indicates the switch from the EV mode to the HV mode, while the broken line indicates the switch from the HV mode to the EV mode. The EV mode is EV mode 2 described above.

As described above, in the switch from the EV mode to the HV mode, the target output Ftgt reaches the motor output upper limit Fout2 at the accelerator position P=the first accelerator position Pr1, and the target output Ftgt is limited to the motor output upper limit Fout2 while the accelerator position is in a range between the first accelerator position Pr1 and the switching accelerator position Psw2. When the accelerator position exceeds the switching accelerator position Psw2, the controller 4 starts the engine and shifts the running mode to the HV mode.

When the switch to the HV mode is completed, the controller 4 increases the motor output upper limit from Fout2 to Fout1. Note that the motor output upper limit Fout1 corresponds to the motor output upper limit in EV mode 1 described above. In addition, the controller 4 sets Psw1 as the switching accelerator position at which the HV mode is switched to the EV mode. Here, Psw1<Psw2 is established. That is, after the switch to the HV mode is completed, the controller 4 sets the switching accelerator position Psw1 from the HV mode to the EV mode to a value lower than the switching accelerator position Psw2 from the EV mode to the HV mode, and sets the motor output upper limit Fout1 after the HV mode is switched to the EV mode to a value higher than the motor output upper limit Fout2 before the switch to the HV mode is completed.

With the process described above, after the switch to the HV mode is completed, the occurrence of what is called hunting between the EV mode and the HV mode is prevented.

The controller 4 executes a process of starting the engine when the required torque Trq exceeds a predetermined threshold torque Tsw (a torque-dependent engine start process) independent from the above-described process. The torque-dependent engine start process is described. Note that "starting the engine" means the switch from the EV mode to the HV mode.

Figure 6:
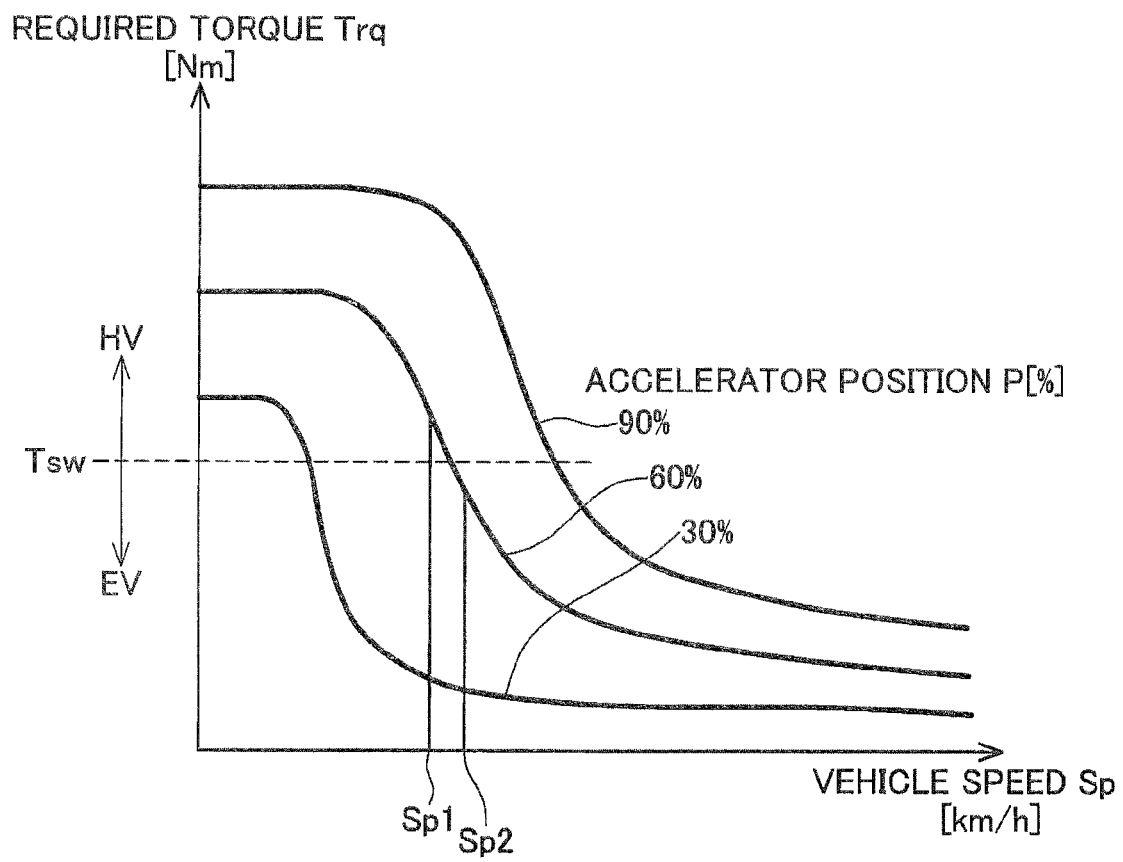
FIG. 6 is a graph for explaining an EV/HV mode switch process corresponding to the required torque.

FIG. 6 is a graph showing the relationship between the required torque Trq and the vehicle speed Sp. The graph of FIG. 6 is the same as the graph of FIG. 2. As described above, even when the accelerator position is unchanged, the required torque is changed depending on the vehicle speed. In the torque-dependent engine start process, the controller 4 monitors the required torque Trq determined in accordance with the vehicle speed and the accelerator position and, when the required torque Trq exceeds the predetermined switching torque Tsw, the controller 4 starts the engine and switches from the EV mode to the HV mode. For example, in FIG. 6, the case of the accelerator position P=60% is assumed. In the case of the present vehicle speed Sp=Sp2, the required torque Trq is smaller than the switching torque Tsw, and hence the controller 4 keeps the EV mode. For example, when the vehicle goes up a steep slope, the vehicle speed is reduced even when the accelerator position is unchanged. Even when the accelerator position is still 60%, if the vehicle speed is reduced to Sp1, the required torque Trq exceeds the switching torque Tsw. Therefore, the controller 4 starts the engine and switches from the EV mode to the HV mode. Note that the controller 4 stops the torque-dependent engine start process when EV mode 2 described above is selected.

EV mode 1 or EV mode 2 is selected using the mode selection switch 22 (see FIG. 1) provided at the driver's seat. That is, EV mode 1 or EV mode 2 is selected based on the will of the user. In addition, EV mode 1 or EV mode 2 is selected using the signal from the car navigator 24. For example, since economical driving is desired in an urban area, in the case where the present position of the vehicle is in the urban area, the car navigator 24 transmits the signal that requests the selection of EV mode 2 to the controller 4. Based on the signal from the car navigator 24, the controller 4 switches from EV mode 1 to EV mode 2 if other conditions of the vehicle (e.g., the SOC of the battery and the like) allow doing so.

Figure 7:
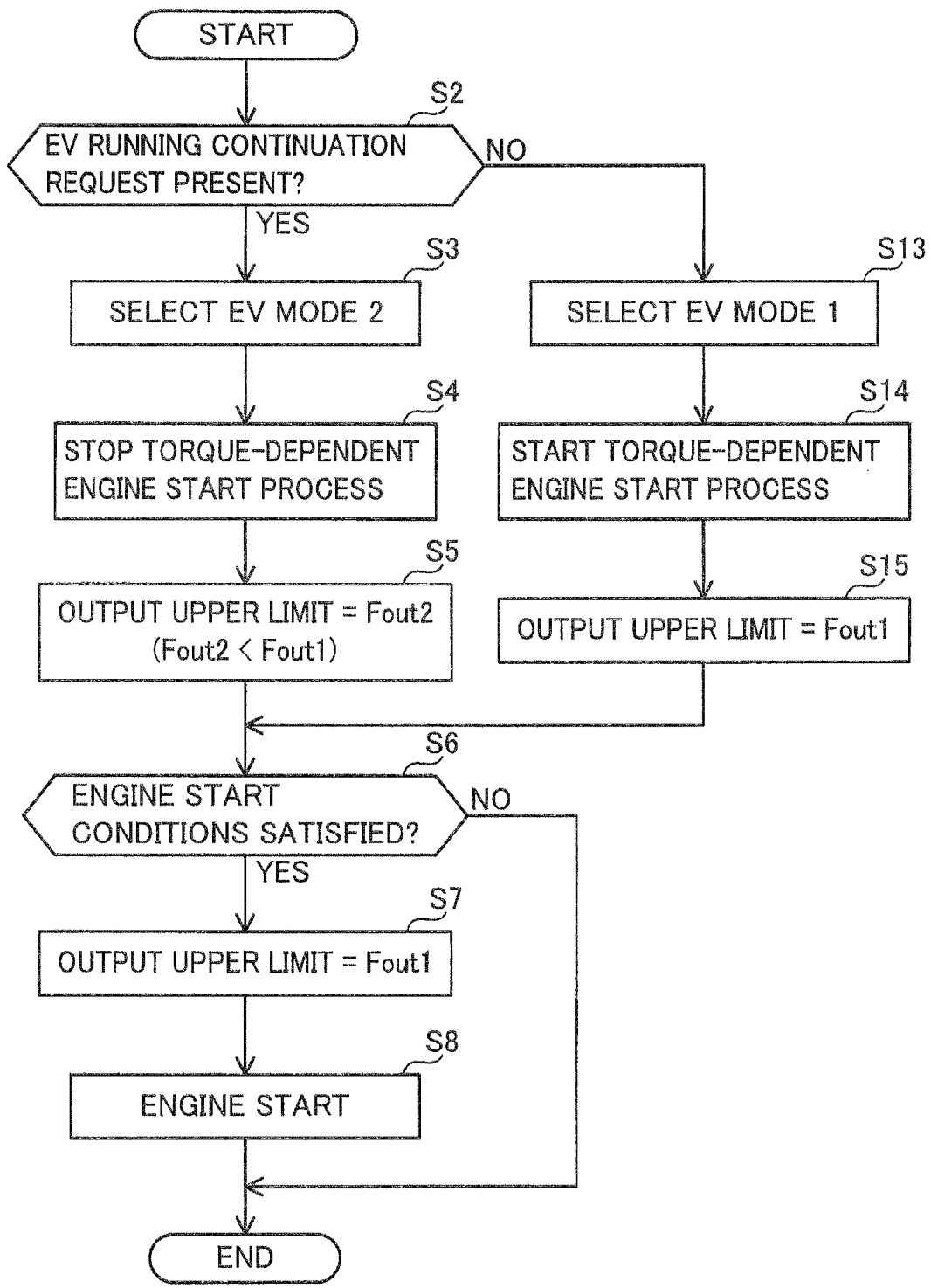
FIG. 7 is a flowchart of an EV mode switch process.

FIG. 7 shows a flowchart of the EV mode switch process. First, the controller 4 checks whether or not an EV running continuation request is present (S2). In the case of the present embodiment, several "EV running continuation requests" are assumed. One of them is a signal from the mode selection switch 22 provided at the driver's seat. The selection of EV mode 1 by the user corresponds to one of the "EV running continuation requests". In addition, the signal for selecting EV mode 2 from the navigator corresponds to one of the "EV running continuation requests".

In the case where the EV running continuation request is present (S2: YES), the controller 4 selects EV mode 2 (S3) and, in the case where the EV running continuation request is not present, the controller 4 selects EV mode 1 (S13). In the case where EV mode 1 is selected, the controller 4 starts the torque-dependent engine start process described above (S14), and sets Fout1 as the motor output upper limit in the EV mode (S15).

On the other hand, in the case where EV mode 2 is selected, the controller 4 stops the torque-dependent engine start process (S4), and sets Fout2 as the motor output upper limit in the EV mode (S5). Herein, Fout2<Fout1 is established.

The switch process from the EV mode to the HV mode after the motor output upper limit is set is as described above. That is, the controller starts the engine and shifts the running mode to the HV mode when the accelerator position P has reached the switching accelerator position Psw (S6 to S8). Note that the switching accelerator position=Psw1 is established in the case of EV mode 1, while the switching accelerator position=Psw2 is established in the case of EV mode 2. Prior to the engine start, the controller 4 sets the motor output upper limit back to Fout1 (S7). That is, the motor upper limit is set to Fout2 which is lower than Fout1 in the case of EV mode 2, and the controller 4 increases the motor output upper limit to Fout1 prior to the engine start. This is because the motor output upper limit Fout2 may be excessively low in order to output the driving force for running and the driving force for starting the engine at the same time. After increasing the motor output upper limit, the controller 4 starts the engine (S8). The controller 4 repeats the process of FIG. 7 at every control cycle.

Figure 8:
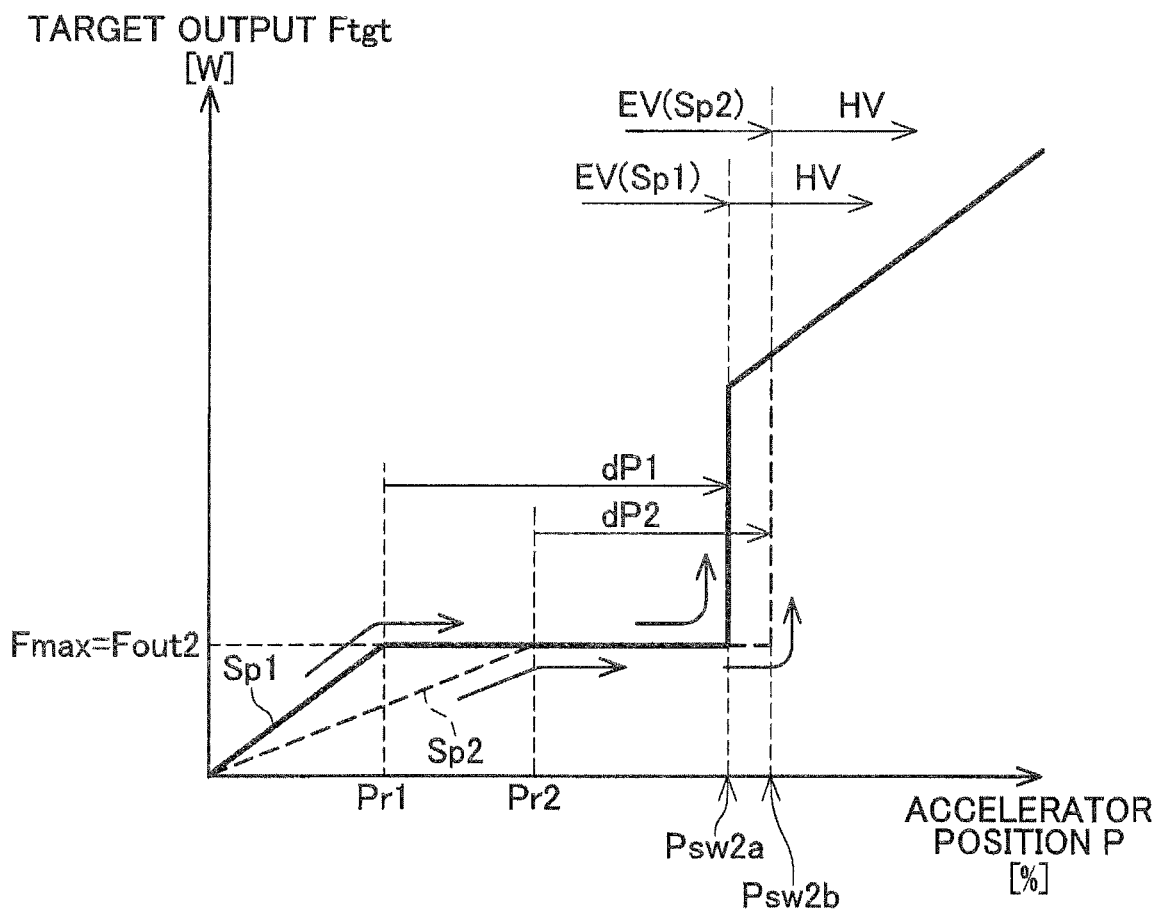
FIG. 8 is a graph showing mode switch in different vehicle speeds (modification).

Next, a modification of the switch process from the EV mode to the HV mode in EV mode 2 is described. FIG. 8 shows the relationship between the accelerator position P and the target output Ftgt in the modification. In the case of the vehicle speed Sp=Sp1, the target output reaches the motor output upper limit Fout2 at the accelerator position P=PH. At this point, the controller 4 sets Psw2a=Pr1+dP1 as the accelerator position at which EV mode 2 is switched to the HV mode (the switching accelerator position Psw). On the other hand, in the case of the vehicle speed Sp=Sp2 (<Sp1), the target output Ftgt reaches the motor output upper limit Fout2 at the accelerator position P=Pr2 (>Pr1). At this point, the controller 4 sets Psw2b=Pr2+dP2 as the switching accelerator position Psw at which EV mode 2 is switched to the HV mode. Herein, dP2<dP1 is established. That is, in the case where the motor output upper limit Fout2 has been reached at the first accelerator position Pr1, the controller 4 sets the increase of the accelerator position from the first accelerator position Pr1 to the switching accelerator position Psw2a at which the switch to the HV mode is to be made as the first increase dP1 and, in the case where the motor output upper limit Fout2 has been reached at the second accelerator position Pr2 which is larger than the first accelerator position Pr1, the controller 4 sets the increase of the accelerator position from the second accelerator position Pr2 to the switching accelerator position Psw2b as the second increase dP2 which is smaller than the first increase dP1. As is clearly shown in FIG. 8, in the case where the vehicle speeds are different (Sp1 and Sp2), even when a difference between the accelerator positions at which the motor output upper limit Fout2 is reached (Pr2−Pr1) is large, a difference between the switching accelerator positions at which the EV mode is switched to the HV mode (Psw2b−Psw2a) is smaller than (Pr2−PH). That is, a fluctuation in switching accelerator position at which the EV mode is switched to the HV mode (Psw2b−Psw2a) is smaller than a fluctuation in accelerator position at which the motor output upper limit Fout2 is reached (Pr2−Pr1). Consequently, it becomes easy for the user to control the accelerator position such that the running mode is not switched to the HV mode.

A supplementary description is given of the effect of EV mode 2. As compared with EV mode 1, EV mode 2 increases the switching accelerator position Psw at which the running mode is shifted to the HV mode and reduces the motor output upper limit Fmax. The motor output upper limit Fmax substantially corresponds to the output upper limit Wmax of the main battery 5. That is, a reduction in motor output limit from Fout1 to Fout2 leads to a reduction in the output upper limit Wmax of the main battery 5. Accordingly, in EV mode 2, the output of the motor is suppressed to a low value, and power consumption of the main battery 5 is also suppressed. Accordingly, EV mode 2 has the advantage of preventing degradation of the main battery 5. Conventionally, in the case where the EV mode is frequently used, the output upper limit of the motor (or the output upper limit of the battery) is increased such that the large driving force can be obtained. However, when the output upper limit of the motor (or the output upper limit of the battery) is increased, the main battery 5 becomes likely to be overheated and the number of cases where the controller is prohibited from selecting the EV mode increases. That is, increasing the output upper limit of the motor (or the output upper limit of the battery) does not always lead to an increase in the ratio of use of the EV mode. In the technology disclosed in the present specification, contrary to the conventional case, the mode in which the output upper limit of the motor is reduced is prepared for the user who desires to use the EV mode frequently. By reducing the output upper limit of the motor to suppress the overheat of the main battery 5, it is possible to keep the EV mode for a long time period.

Notable points related to the technology of the embodiment are described. In the embodiment, EV mode 1 (the first EV mode) or EV mode 2 (the second EV mode) is selected using the signal from the mode selection switch 22 provided at the driver's seat or the signal from the car navigator 24. However, the mode selection is not limited thereto, and the mode may alternatively be selected using a signal from an infrastructure. For example, in the future, EV mode priority may be obliged in a specific area such as a central area of a big city. In such a case, the mode selection may be performed using a signal from a communication device disposed outside the vehicle (i.e., the infrastructure).

In addition, in the embodiment described above, the controller 4 reduces the motor output upper limit Fmax. As described above, when the motor output upper limit Fmax is reduced, the output upper limit Wmax of the main battery 5 is also reduced. Accordingly, the controller 4 may reduce the output upper limit Wmax of the main battery 5 instead of reducing the motor output upper limit Fmax. Further, the output of the main battery 5 is reduced by setting the upper limit to the required torque and reducing the upper limit. Hence the same effect as that of the embodiment, i.e., the effect of preventing the degradation of the main battery 5 can be obtained. Therefore, the controller 4 may reduce the upper limit of the required torque instead of reducing the motor output upper limit Fmax.

Note that the controller 4 cannot set the motor output upper limit arbitrarily. The upper limit of the motor output upper limit that can be set is determined by hardware requirements of the hybrid system and the temperature of the motor. The controller 4 determines the motor output upper limit Fmax according to the process of the above embodiment within a range in which the upper limit can be set. Similarly, the upper limit of the main battery output upper limit that can be set is determined by the remaining amount SOC of the battery and the temperature of the battery. The controller 4 determines the battery output upper limit Wmax within a range in which the upper limit can be set.

The controller 4 of the hybrid vehicle 100 has a charge depleting mode (CD mode: battery remaining amount depleting mode) and a charge sustaining mode (CS mode: battery remaining amount sustaining mode) in addition to the first EV mode and the second EV mode described above. The CD mode and the CS mode have different criteria for switching between the EV mode and the HV mode. Roughly speaking, the CD mode is a mode in which the EV mode is prioritized, and the CS mode is a mode in which the HV mode is prioritized. In order to simplify the description, a mode in which the running mode is shifted to the HV mode and it is made easy to keep the battery remaining amount SOC at a target value is referred to as a non-CD mode in the following description.

Roughly speaking, the CD mode is a mode in which the hybrid system is controlled such that the ratio of use of the EV mode is increased. In the CD mode, the controller 4 performs a process of totally prohibiting the engine start, a process of providing a dead band in the vicinity of an engine start threshold value of the accelerator, and a process of enlarging the area of use of the main battery, and sets various engine start threshold values such that the EV running can be easily kept.

The CD mode and the non-CD mode are specifically described. The CD mode is a mode in which the engine 19 is stopped and running only with the second motor 12b is prioritized (i.e., the EV mode). The non-CD mode is a mode in which the engine 19 is driven, the first motor 12a is caused to rotate with the driving force of the engine 19 to generate electric power, and the remaining amount SOC of the main battery 5 is kept at a predetermined amount. The controller 4 automatically switches between the CD mode and the non-CD mode based on the remaining amount SOC of the main battery 5. Specifically, the controller 4 selects the CD mode when the remaining amount SOC is higher than a predetermined threshold SOC, and selects the non-CD mode when the remaining amount SOC is lower than the threshold SOC. In the case of the non-CD mode, the controller 4 controls the engine 19 and the first motor 12a such that the remaining amount SOC is kept at the above threshold SOC.

When the mode selection switch 22 is pressed while the CD mode is selected, the controller 4 of the embodiment switches from the first EV mode to the second EV mode to reduce the battery output upper limit Wmax. In addition, when the mode selection switch 22 is pressed while the CS mode is selected, the controller 4 switches from the CS mode to the CD mode and then shifts the mode to the second EV mode.

Note that the technology disclosed in the present specification can be applied to the hybrid vehicle that completely prohibits the start of the engine during the EV running in the case where an EV running execution request to the vehicle by information input to the vehicle from the outside (e.g., a switch operation by a driver, the signal from the navigator, or the signal from the infrastructure) is present.

The controller of the embodiment is programmed so as to be capable of switching between the following two EV modes (the first EV mode and the second EV mode). In the first EV mode, the controller sets the motor output upper limit Fmax in the EV mode to the first output upper limit Fout1, and sets the switching accelerator position at which the EV mode is switched to the HV mode to the first accelerator position. In the second EV mode, the controller sets the motor output upper limit Fmax in the EV mode to the second output upper limit Fout2 which is lower than the first output upper limit Fout1, and sets the switching accelerator position at which the EV mode is switched to the HV mode to the second switching accelerator position which is larger than the first switching accelerator position. In contrast, as described above, when the motor output upper limit Fmax is reduced, the battery output upper limit Wmax is also reduced. Accordingly, the motor output upper limit Fmax is reduced in the embodiment, and the same effect can be obtained even by reducing the battery output upper limit Wmax instead of the motor output upper limit Fmax. That is, the controller may be programmed so as to be capable of switching between the following two EV modes. In the first EV mode, the controller sets the battery output upper limit Wmax in the EV mode to the first output upper limit Wout1, and sets the switching accelerator position at which the EV mode is switched to the HV mode to the first accelerator position. In the second EV mode, the controller sets the battery output upper limit Wmax in the EV mode to the second output upper limit Wout2 which is lower than the first output upper limit Wout1, and sets the switching accelerator position at which the EV mode is switched to the HV mode to the second switching accelerator position which is larger than the first switching accelerator position.

The controller 4 of the hybrid vehicle 100 preferably increases the motor output upper limit Fmax from the second output upper limit Fout2 to the first output upper limit Fout1 prior to starting the engine when the EV mode is switched to the HV mode in the second EV mode. If the output upper limit is not increased, the motor driving force required to start the engine may become insufficient. By increasing the motor output upper limit, it is possible to reliably start the engine. The controller 4 may increase the battery output upper limit Wmax instead of the motor output upper limit Fmax prior to starting the engine.

In the technology disclosed in the embodiment, the motor output upper limit does not need to be a precisely constant value, and the motor output upper limit may be increased within a range that dose not affect the battery adversely while the accelerator position is in a range between the first accelerator position (or the second accelerator position) and the switching accelerator position, and the output of the motor may be slightly increased correspondingly. Specifically, in the example of FIG. 4, in the case of the vehicle speed Sp=Sp1, the target output Ftgt reaches the motor output upper limit Fout2 at the first accelerator position Pr1, and the target output is kept at the motor output upper limit Fout2 until the accelerator position P reaches Psw2. Herein, the controller 4 may gradually increase the motor output upper limit from Fout2 in accordance with the increase in accelerator position while the accelerator position P is in a range between the first accelerator position Pr1 and the switching accelerator position Psw2, and may gradually increase the target output Ftgt correspondingly. The controller may decrease the ratio of the motor output increase relative to an accelerator operation increase in an accelerator position range from the accelerator position (the first accelerator position Pr1 or the second accelerator position Pr2) at which the output of the motor has reached the output upper limit (Fmax) to the switching accelerator position than in an accelerator position range before the output of the motor has reached the output upper limit.

The technology disclosed in the present specification can be applied to what is called a plug-in hybrid vehicle capable of charging from an external power source.

Representative, non-limiting examples of the present invention have been described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved hybrid vehicle.

Moreover, combinations of features and steps disclosed in the above detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A hybrid vehicle provided with an EV mode in which the hybrid vehicle runs without using an engine and a HV mode in which the hybrid vehicle runs using a combination of the engine and a motor, the hybrid vehicle comprising a controller configured to set an output upper limit for the motor and configured to adjust an output of the motor to the output upper limit or less in accordance with a vehicle speed and an accelerator position,
   wherein, during running in the EV mode, the controller is configured to:
   set an increase of the accelerator position from a first accelerator position to a switching accelerator position, at which a switch to the HV mode is to be made, as a first increase when the output of the motor has reached the output upper limit at the first accelerator position; and
   set an increase of the accelerator position from a second accelerator position to the switching accelerator position, at which the switch to the HV mode is to be made, as a second increase when the output of the motor has reached the output upper limit at the second accelerator position which is larger than the first accelerator position, the second increase being smaller than the first increase.

2. The hybrid vehicle of claim 1, wherein the controller is configured to decrease a ratio of a motor output increase relative to an accelerator operation increase in an accelerator position range from an accelerator position at which the output of the motor has reached the output upper limit to the switching accelerator position than in an accelerator position range before the output of the motor has reached the output upper limit.

3. The hybrid vehicle of claim 2, wherein the controller is configured to keep the output of the motor at a level by which the accelerator position has reached the first accelerator position while the accelerator position is in a range between the first accelerator position and the switching accelerator position or in a range between the second accelerator position and the switching accelerator position.

4. The hybrid vehicle of claim 2, wherein the controller is configured to gradually increase the output upper limit of the motor in accordance with an increase in the accelerator position, and gradually increase the output of the motor within a range of and below the output upper limit while the accelerator position is in a range between the first accelerator position and the switching accelerator position or in a range between the second accelerator position and the switching accelerator position.

5. The hybrid vehicle of claim 1 wherein
   the controller is able to execute a torque-dependent engine start process in which the controller starts the engine when a required torque exceeds a predetermined torque upper limit, the required torque being determined in accordance with the vehicle speed and the accelerator position independent from an EV mode control described in claim 1, and the controller switches between the torque-dependent engine start process and the EV mode control based on a signal from a switch operated by a driver or a signal from a navigator.

6. The hybrid vehicle of claim 1, wherein, after having switched to the HV mode, the controller sets the switching accelerator position for switching from the HV mode to the EV mode to be less than the switching accelerator position for switching from the EV mode to the HV mode, and the controller sets the output upper limit after having switched from the HV mode to the EV mode to be greater than the output upper limit before having switched to the HV mode.

* * * * *